(12) United States Patent
Hagita et al.

(10) Patent No.: US 12,555,947 B2
(45) Date of Patent: Feb. 17, 2026

(54) CHARGING CONNECTOR

(71) Applicant: Yazaki Corporation, Tokyo (JP)

(72) Inventors: Sho Hagita, Shizuoka (JP); Yasutaka Miyazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 739 days.

(21) Appl. No.: 17/948,535

(22) Filed: Sep. 20, 2022

(65) Prior Publication Data

US 2023/0090258 A1 Mar. 23, 2023

(30) Foreign Application Priority Data

Sep. 22, 2021 (JP) ................................. 2021-153948

(51) Int. Cl.
| | |
|---|---|
| *H01R 13/52* | (2006.01) |
| *B60L 53/16* | (2019.01) |
| *H01R 27/02* | (2006.01) |
| *H01R 107/00* | (2006.01) |
| *H02J 7/00* | (2006.01) |

(52) U.S. Cl.
CPC .......... *H01R 13/5213* (2013.01); *B60L 53/16* (2019.02); *H01R 27/02* (2013.01); *H02J 7/0042* (2013.01); *H01R 2107/00* (2013.01); *H01R 2201/26* (2013.01)

(58) Field of Classification Search
CPC ............................ H01R 13/5213; H01R 27/02; H01R 2107/00; H01R 2201/26; B60L 53/16; H02J 7/0042

USPC .......................................................... 320/107
See application file for complete search history.

(56) References Cited

U.S. PATENT DOCUMENTS

| | | | |
|---|---|---|---|
| 2013/0157485 A1* | 6/2013 | Yamamaru ............. | B60K 15/04 174/67 |
| 2023/0090258 A1* | 3/2023 | Hagita ................... | H01R 27/02 320/107 |
| 2024/0372304 A1* | 11/2024 | Iwami .................... | B60L 53/16 |

FOREIGN PATENT DOCUMENTS

| | | |
|---|---|---|
| EP | 3 848 230 A1 | 7/2021 |
| JP | 2017-208290 A | 11/2017 |
| JP | 2019-102326 A | 6/2019 |

* cited by examiner

*Primary Examiner* — Suresh Memula
(74) *Attorney, Agent, or Firm* — Sughrue Mion, PLLC (57) ABSTRACT

A charging connector includes a housing and a cover. The housing includes a normal fitting part and a quick fitting part. The normal fitting part has a normal frontage to which a normal charging connector is finable. The quick fitting part has a quick frontage to which a quick charging connector is finable. The cover is configured to close the quick frontage. The quick fitting part has a terminal insertion hole through which a terminal of the quick charging connector is insertable inside the quick fitting part. The cover has a first protrusion extending toward the terminal insertion hole and holding the cover on the housing with the first protrusion being inserted into the terminal insertion hole.

8 Claims, 10 Drawing Sheets

CHARGING CONNECTOR

CROSS REFERENCE TO RELATED APPLICATION

The present application is based on, and claims priority from the prior Japanese Patent Application No. 2021-153948, filed on Sep. 22, 2021, the entire contents of which are incorporated herein by reference.

TECHNICAL FIELD

The disclosure relates to a charging connector.

BACKGROUND

Japanese Unexamined Patent Application Publication No. 2019-102326 discloses a charging connector which includes a housing. The housing includes a normal fitting part having a normal frontage to which a normal charging connector can be fitted and a quick fitting part having a quick frontage to which a quick charging connector can be fitted.

The above charging connector is applied to an electric vehicle, a hybrid vehicle, or the like and charges a battery mounted in the vehicle. The normal fitting part houses a terminal for normal charging that is electrically connected to the battery. The quick fitting part houses a terminal for quick charging that is electrically connected to the battery. The terminals are housed inside the normal fitting part and the quick fitting part through terminal insertion holes formed in the normal fitting part and the quick fitting part.

The above charging connector allows the battery to be charged by the normal charging connector or the quick charging connector provided in power supply equipment being fitted to the normal frontage or the quick frontage depending on the usage situation.

SUMMARY

In the above charging connector, the housing has the normal frontage to which the normal charging connector is fitted and the quick frontage to which the quick charging connector is fitted. In recent years, plug-in hybrid vehicles often do not use large capacity batteries and often do not require quick frontages for quick charging connectors.

For this reason, it is conceivable to attach a cover to the charging connector in order to close the quick frontage of the housing. For example, it is conceivable to attach the cover to the vehicle body to close the quick frontage. However, the structure of attaching the cover to the vehicle body requires a design change for the vehicle body. It is also conceivable to attach the cover to the outside of the housing to close the quick frontage. However, even a structure for attaching the cover to the outside of the housing requires a design change for the outside of the housing.

The disclosure is directed to a charging connector that can close a quick frontage by using a cover without changing the design of a housing.

A charging connector in accordance with some embodiments includes a housing and a cover. The housing includes a normal fitting part and a quick fitting part. The normal fitting part has a normal frontage to which a normal charging connector is fittable. The quick fitting part has a quick frontage to which a quick charging connector is fittable. The cover is configured to close the quick frontage. The quick fitting part has a terminal insertion hole through which a terminal of the quick charging connector is insertable inside the quick fitting part. The cover has a first protrusion extending toward the terminal insertion hole and holding the cover on the housing with the first protrusion being inserted into the terminal insertion hole.

According to the above configuration, in the charging connector, the quick frontage can be closed by using the cover without changing the design of the housing.

DETAILED DESCRIPTION

Various embodiments will be described hereinafter with reference to the accompanying drawings.

Hereafter, a charging connector according to the present embodiment will be described in detail with reference to the drawings. Note that the dimensional ratios in the drawings are exaggerated for illustrative purposes and may differ from the actual ratios.

A charging connector 1 according to the present embodiment is applied to an electric vehicle, a hybrid vehicle, or the like and allows a battery mounted in a vehicle to be charged as illustrated in FIGS. 1 to 8. The charging connector 1 can be fitted to both a normal charging connector (not illustrated) and a quick charging connector (not illustrated) provided in power supply equipment. The charging connector 1 has a housing 3 and a cover 5. The housing 3 houses both a terminal for normal charging (not illustrated) and a terminal for quick charging (not illustrated).

As illustrated in FIGS. 1 to 6, the housing 3 is made of an insulating material such as a synthetic resin, for example. In the housing 3, an outer wall 9 is formed which extends in a cylindrical shape from a bottom wall 7 in the fitting direction in which the charging connector 1 is fitted to the normal charging connector and the quick charging connector. The interior of the outer wall 9 of the housing 3 is partitioned into a normal fitting part 11 that can be fitted to the normal charging connector and a quick fitting part 13 that can be fitted to the quick charging connector.

The normal fitting part 11 is arranged at the upper portion in the outer wall 9. The side of the normal fitting part 11 opposite to the bottom wall 7 is a normal frontage 15 which is opened such that the normal charging connector can be inserted therethrough. In the normal fitting part 11, a normal inner wall 17 is formed which extends in a cylindrical shape from the bottom wall 7 in the fitting direction in which the charging connector 1 is fitted to the normal charging connector. A plurality of (in this case, seven) normal terminal housing chambers 19 are formed inside the normal inner wall 17. The normal frontage 15 side of the normal terminal housing chambers 19 is opened such that a mating terminal (not illustrated) housed in the normal charging connector can be inserted. Therefore, openings of the normal terminal housing chambers 19 on the normal frontage 15 side constitute a part of the normal frontage 15 of the normal fitting part 11 as a part into which the electrical connection part of the normal charging connector is inserted. The side of the normal terminal housing chambers 19 opposite to the normal frontage 15 is formed through the bottom wall 7 and constitutes terminal insertion holes 21 through which terminals for normal charging (not illustrated) can be inserted into the normal terminal housing chambers 19. The terminals for normal charging are housed in the plurality of normal terminal housing chambers 19 through the terminal insertion holes 21.

The terminal for normal charging is electrically connected to a terminal part of an electric wire (not illustrated) which is electrically connected to a battery (not illustrated). The terminal for normal charging is electrically connected to the mating terminal housed in the normal charging connector by the normal charging connector being fitted to the normal fitting part 11. The battery is charged from the power supply equipment by means of the electrical connection between the terminal for normal charging and the mating terminal.

The quick fitting part 13 is arranged at the lower portion in the outer wall 9. The side of the quick fitting part 13 opposite to the bottom wall 7 is a quick frontage 23 which is opened such that the quick charging connector can be inserted therethrough. In the quick fitting part 13, a quick inner wall 25 is formed, which extends in a cylindrical shape from the bottom wall 7 in the fitting direction in which the charging connector 1 is fitted to the quick charging connector. A plurality of (in this case, two) quick terminal housing chambers 27 are formed in the quick inner wall 25. The quick frontage 23 side of the quick terminal housing chambers 27 is opened such that a mating terminal (not illustrated) housed in the quick charging connector can be inserted. Therefore, openings of the quick terminal housing chambers 27 on the quick frontage 23 side constitute a part of the quick frontage 23 of the quick fitting part 13 as a part into which the electrical connection part of the quick charging connector is inserted. The side of the quick terminal housing chambers 27 opposite to the quick frontage 23 is formed through the bottom wall 7 and constitutes terminal insertion holes 29 through which terminals for quick charging (not illustrated) can be inserted into the quick terminal housing chambers 27. The terminals for quick charging are housed in the plurality of quick terminal housing chambers 27 through the terminal insertion holes 29.

The terminal for quick charging is electrically connected to a terminal part of an electric wire (not illustrated) that is electrically connected to a battery (not illustrated). The terminal for quick charging is electrically connected to a mating terminal housed in the quick charging connector by the quick charging connector being fitted to the quick fitting part 13. The battery is charged from the power supply equipment by means of the electrical connection between the terminal for quick charging and the mating terminal.

The terminals for normal charging and quick charging housed in the housing 3 are held in the housing 3 by means of a rear holder (not illustrated) attached to the housing 3. The housing 3 may have a locking lance that is engaged with the terminal. A slide holder may be attached to the housing 3. The slide holder can move between a temporary locking position at which it is possible for the terminal to be housed and a main locking position at which the terminal is engaged.

When the charging connector 1 having this kind of normal fitting part 11 and quick fitting part 13 is applied to a vehicle in which a large capacity battery is not mounted, the quick fitting part 13 may not be used, for example. Therefore, the quick frontage 23 of the quick fitting part 13 is closed by using the cover 5.

As illustrated in FIGS. 1 to 4, 7, and 8, the cover 5 is made of an insulating material such as a synthetic resin, for example. The cover 5 has body parts 31, a closing part 33, a first protrusion 35, and a second protrusion 37.

Figure 7:
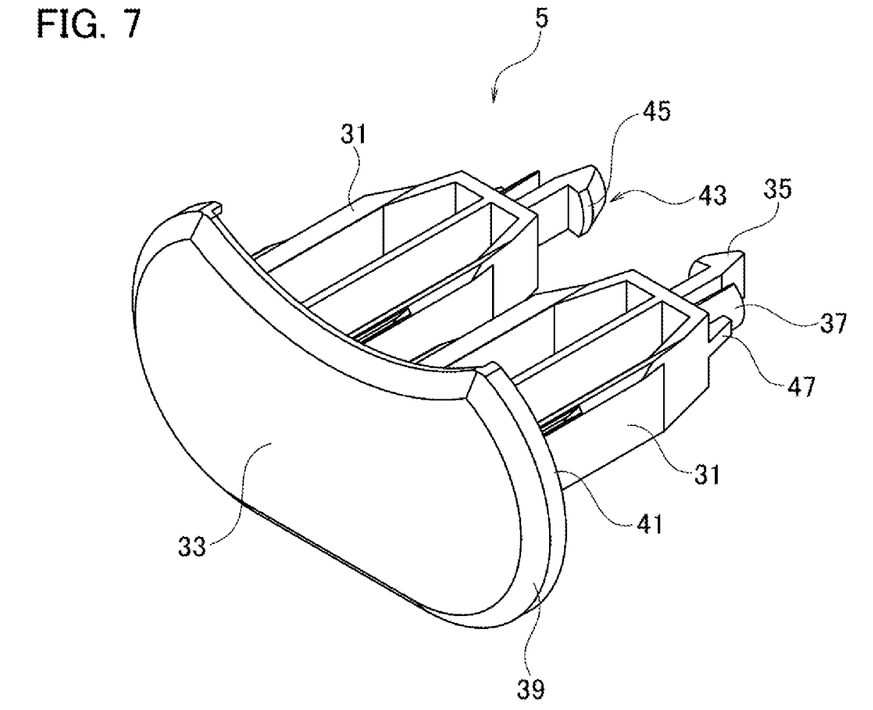
FIG. 7 is a perspective view of a cover of a charging connector according to an embodiment.
Figure 8:
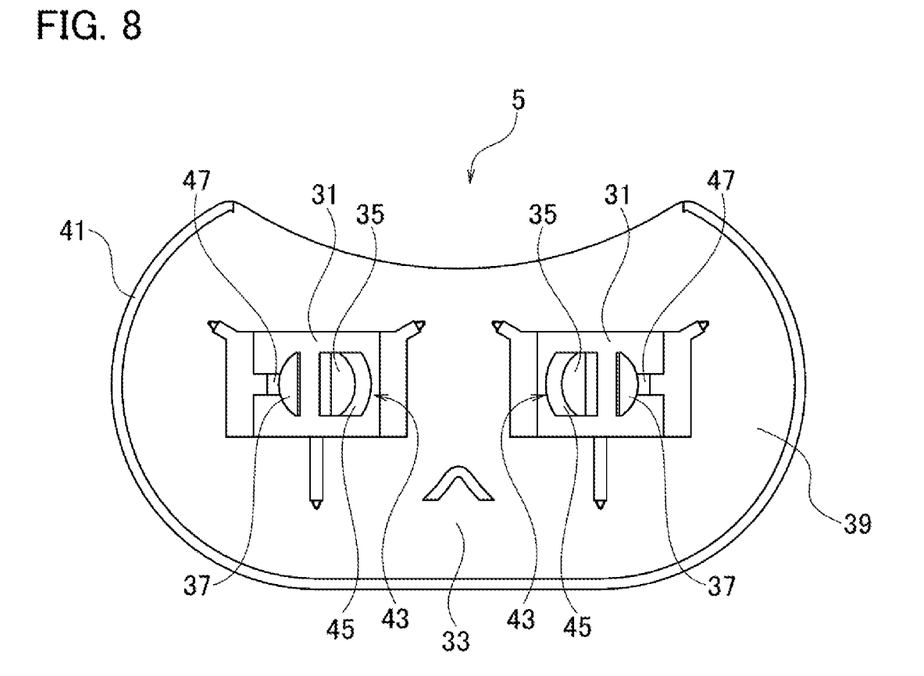
FIG. 8 is a front view of a cover of a charging connector according to an embodiment.

A plurality of (in this case, two) body parts 31 are formed so as to extend in the fitting direction in which the charging connector 1 is fitted to the quick charging connector. The body parts 31 are housed in a plurality of (in this case, two) quick terminal housing chambers 27 while the cover 5 is attached to the housing 3. The central parts of the body parts 31 are hollowed out to reduce the amount and weight of materials used. The outer diameter of the body parts 31 may be set equal to the inner diameter of the quick terminal housing chambers 27, and the body parts 31 may be housed in the quick terminal housing chambers 27.

The closing part 33 is formed of a member continuous with the plurality of body parts 31 on the quick frontage 23 side of the plurality of body parts 31. The closing part 33 is formed continuously in a plane direction parallel to the end face of the quick inner wall 25 so as to be able to close the openings of the quick terminal housing chambers 27 forming at least the quick frontage 23. The closing part 33 closes the openings of the quick terminal housing chambers 27 which constitute at least the quick frontage 23 while the cover 5 is attached to the housing 3. A flange 39 is provided at the outer periphery of the closing part 33.

The flange 39 is formed at the outer periphery of the closing part 33 and is formed of a member continuous with the closing part 33. The flange 39 is formed continuously in the circumferential direction at the outer periphery of the closing part 33 so as to be able to close between the outer wall 9 and the quick inner wall 25 constituting the quick frontage 23. The outer edge of the flange 39 is set equal to or slightly smaller than the inner edge of the outer wall 9 constituting the quick frontage 23. The flange 39 closes the quick frontage 23 together with the closing part 33 while the cover 5 is attached to the housing 3. A wall 41 is provided at the outer periphery of the flange 39.

The wall 41 is formed at the outer periphery of the flange 39 and is formed of a member continuous with the flange 39.

The wall 41 extends from the flange 39 toward the terminal insertion holes 29 inside the quick fitting part 13 so as to be able to face the inner surface of the outer wall 9 constituting the quick frontage 23. Further, the wall 41 is formed continuously in the circumferential direction. The wall 41 is housed inside the quick fitting part 13 while the cover 5 is attached to the housing 3. The wall 41 is arranged to face the inner surface of the outer wall 9 constituting the quick frontage 23 with or without a minute gap therebetween.

By providing this kind of wall 41 at the flange 39, it is possible to make it difficult to insert a thin rod-shaped jig or the like between the flange 39 and the outer wall 9. In addition, by extending the wall 41 toward the terminal insertion holes 29, even if a jig or the like is inserted, the tip part of the jig is not able to catch and it can be made difficult for the lever action to function. Therefore, it is possible to prevent an end user from forcibly removing the cover 5 attached to the housing 3, for example.

The first protrusion 35 is formed at each end of each of the plurality of body parts 31 on the terminal insertion holes 29 side and is formed of a member continuous with the body parts 31. The first protrusion 35 extends from the body parts 31 toward the terminal insertion holes 29 such that the first protrusion 35 can be inserted into the terminal insertion hole 29. The first protrusion 35 is formed at the body part 31 in an elastically deformable manner. The first protrusion 35 and the second protrusion 37 are adjacent to each other and the first protrusion 35 is arranged further inside the closing part 33 than the second protrusion 37. The first protrusion 35 is inserted into the terminal insertion hole 29 while the cover 5 is attached to the housing 3, and holds the cover 5 on the housing 3. The first protrusion 35 has a locking part 43.

Figure 1:
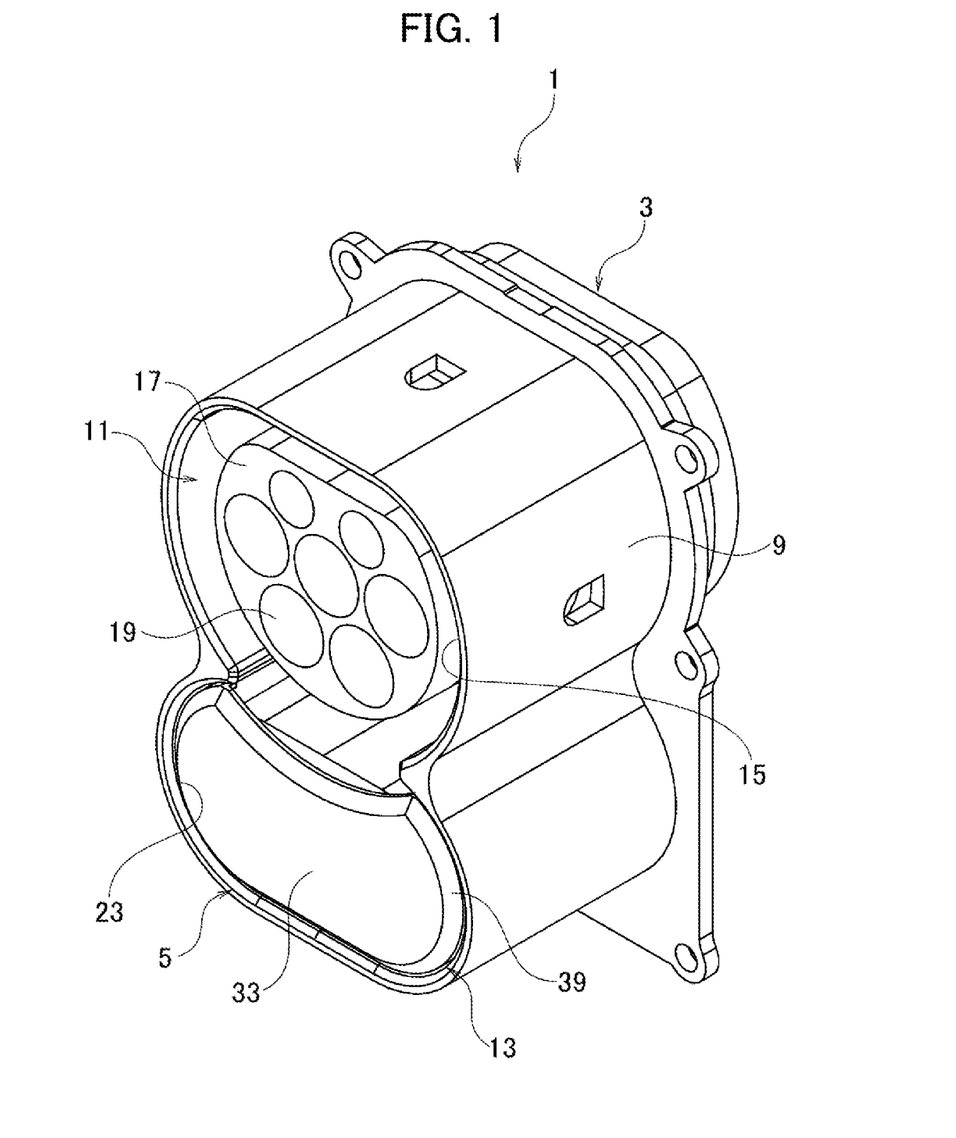
FIG. 1 is a perspective view of a charging connector according to an embodiment.
Figure 2:
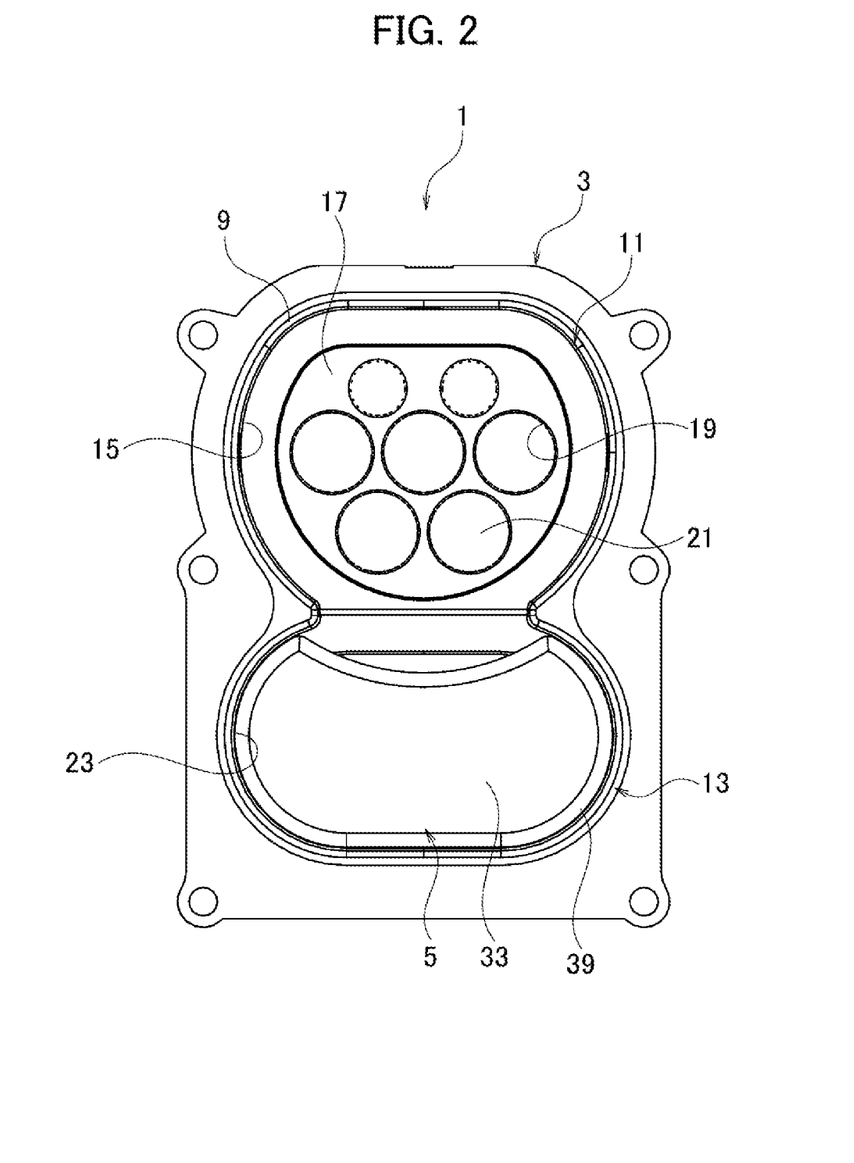
FIG. 2 is a front view of a charging connector according to an embodiment.
Figure 3:
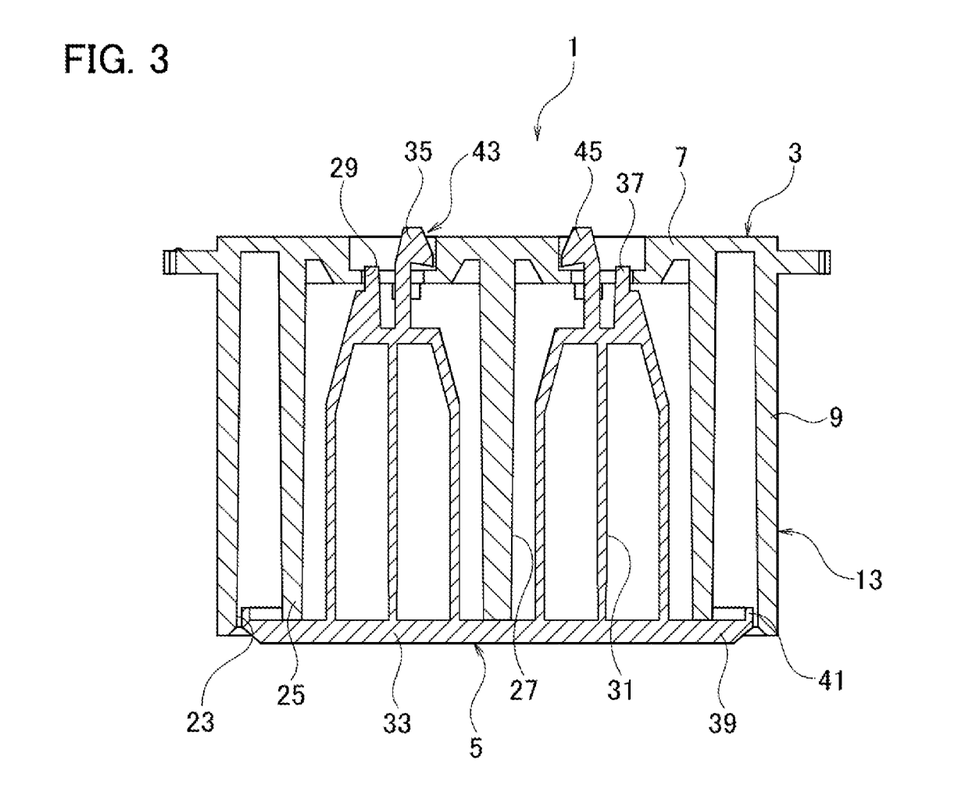
FIG. 3 is a cross-sectional view of a charging connector according to an embodiment.
Figure 4:
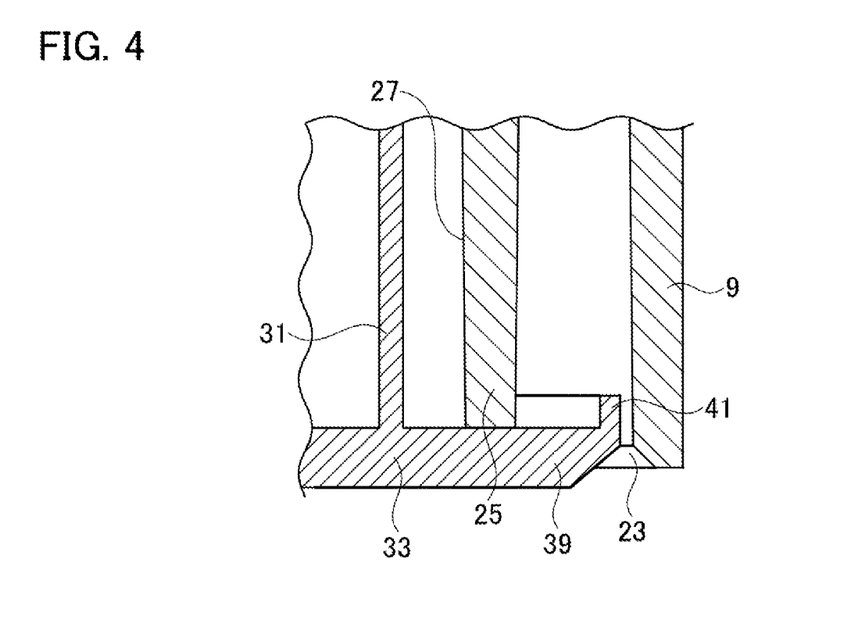
FIG. 4 is an enlarged view of the main part of FIG. 3.
Figure 5:
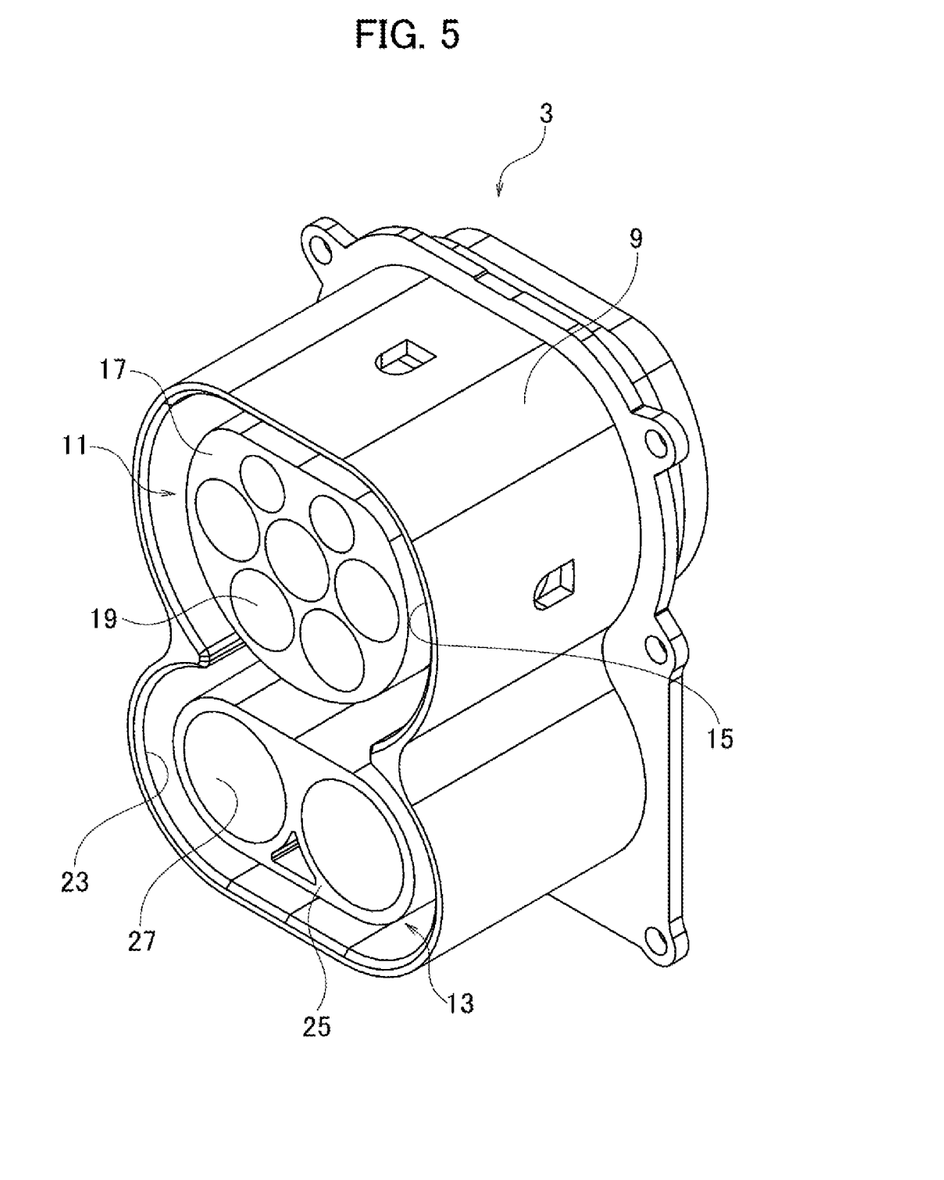
FIG. 5 is a perspective view of a housing of a charging connector according to an embodiment.
Figure 6:
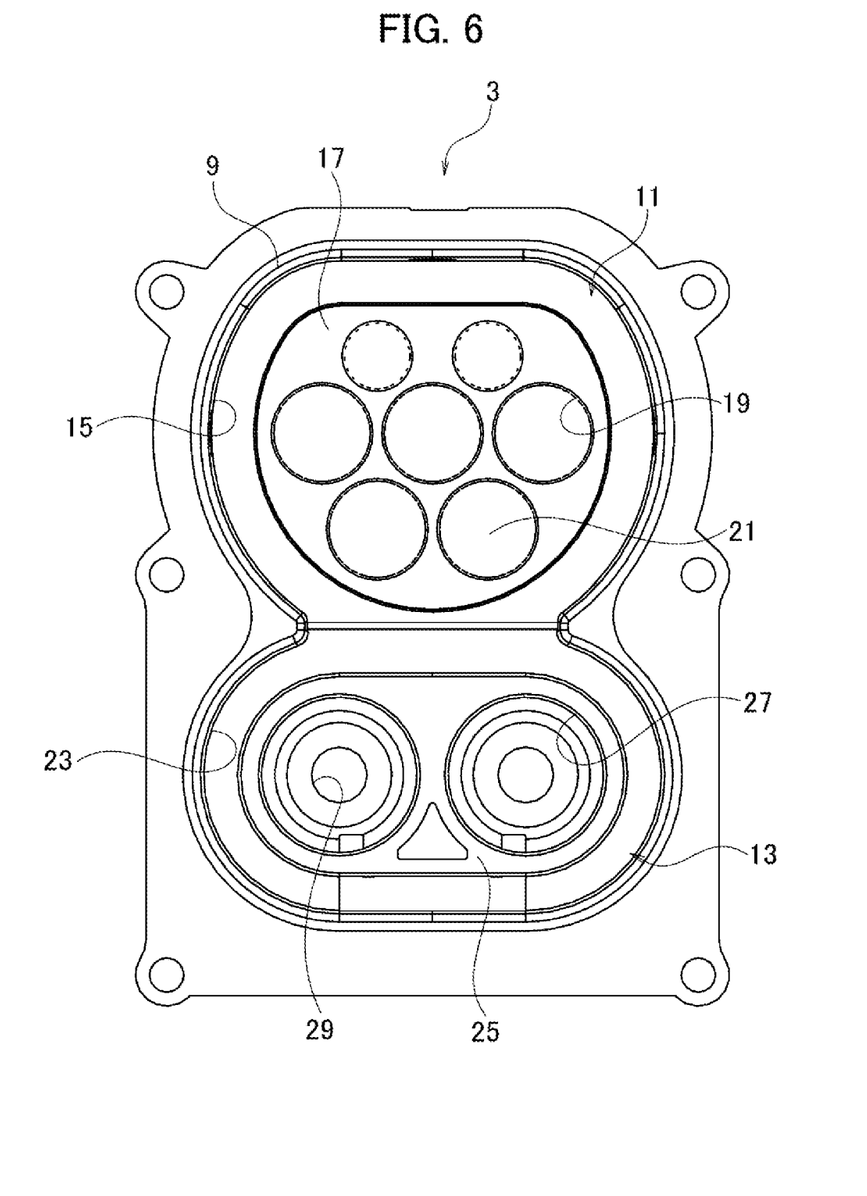
FIG. 6 is a front view of a housing of a charging connector according to an embodiment.

The locking part 43 is a locking projection 45 formed of a member continuous with the first protrusion 35 on the tip side of the first protrusion 35. The locking projection 45 projects from the first protrusion 35 toward the inside of the closing part 33 (in this case, toward the side of the adjacent body part 31). The surface of the locking projection 45 on the terminal insertion holes 29 side is an inclined surface that inclines upward from the terminal insertion holes 29 side to the closing part 33 side. The surface of the locking projection 45 on the closing part 33 side is a locking surface formed parallel to or slightly inclined to the bottom wall 7. The inclined surface of the locking projection 45 slides against the edge of the terminal insertion hole 29 when the first protrusion 35 is inserted into the terminal insertion hole 29. When the inclined surface of the locking projection 45 slides against the edge of the terminal insertion holes 29, the first protrusion 35 is elastically deformed. When the first protrusion 35 is inserted into the terminal insertion hole 29, the elastically deformed first protrusion 35 is restored and the locking surface of the locking projection 45 is engaged with the edge of the terminal insertion hole 29. When the locking surface of the locking projection 45 is engaged with the edge of the terminal insertion holes 29, the first protrusion 35 is prevented from slipping out from the terminal insertion hole 29, and the state in which the cover 5 is attached to the housing 3 is maintained.

By providing the first protrusion 35 having the locking part 43 on the cover 5, the cover 5 can be attached to the housing 3 using the terminal insertion holes 29 originally provided in the housing 3. Therefore, there is no need to provide a structure for attaching the cover 5 to the outside the housing 3, and there is no need to change the design of the housing 3. In addition, it is not necessary to change the design of a vehicle body.

The second protrusion 37 is formed of a member continuous with the body parts 31 at each end of each of the plurality of body parts 31 on the terminal insertion hole 29 side. The second protrusion 37 extends from the body part 31 toward the terminal insertion hole 29 such that the second protrusion 37 can be inserted into the terminal insertion hole 29. The extension length of the second protrusion 37 is set to be shorter than the extension length of the first protrusion 35. The outer surface of the second protrusion 37 is curved along the inner surface of the terminal insertion hole 29. In the second protrusion 37, a rib 47 is provided across the second protrusion 37 and the body part 31, and the rigidity of the second protrusion 37 is enhanced so that the second protrusion 37 is not elastically deformable. The second protrusion 37 is arranged adjacent to the first protrusion 35 in such a way as to be arranged more to the outer side of the closing part 33 than the first protrusion 35.

By arranging the second protrusion 37 adjacent to the first protrusion 35 in this way, the first protrusion 35 can be protected by the second protrusion 37 when handling the cover 5 alone such as when conveying the cover 5, for example. Therefore, the first protrusion 35 interfering with peripheral members can be suppressed, damage to the first protrusion 35 can be suppressed, and the cover 5 can be held on the housing 3 stably.

This kind of second protrusion 37 is inserted into the terminal insertion hole 29 when the locking part 43 is locked into the terminal insertion hole 29, that is, when the first protrusion 35 is normally inserted into the terminal insertion hole 29. Meanwhile, the second protrusion 37 is not inserted into the terminal insertion hole 29 when the locking part 43 is not locked into the terminal insertion holes 29, that is, when the first protrusion 35 is not inserted into the terminal insertion hole 29 normally. Therefore, by determining whether the second protrusion 37 is inserted into the terminal insertion hole 29, it is possible to detect the insertion state of the first protrusion 35 into the terminal insertion hole 29, and detect the state in which the cover 5 is attached to the housing 3.

The outer surface of the second protrusion 37 abuts on the inner surface of the terminal insertion hole 29 while the second protrusion 37 is inserted into the terminal insertion hole 29. In a state in which the outer surface of the second protrusion 37 abuts on the inner surface of the terminal insertion hole 29, the outer surface of the locking projection 45 abuts on the inner surface of the recess of the bottom wall 7 while the restoring force from the elastic deformation of the first protrusion 35 remains. By the outer surface of the locking projection 45 abutting on the inner surface of the recess of the bottom wall 7 while the energizing force is applied from the first protrusion 35, the locking of the locking part 43 to the terminal insertion hole 29 can be stabilized.

The locking part 43 may have the following configuration, for example. In the following, the second protrusion 37 is omitted, and the body part 31 and the terminal insertion holes 29 are simplified.

Figure 9:
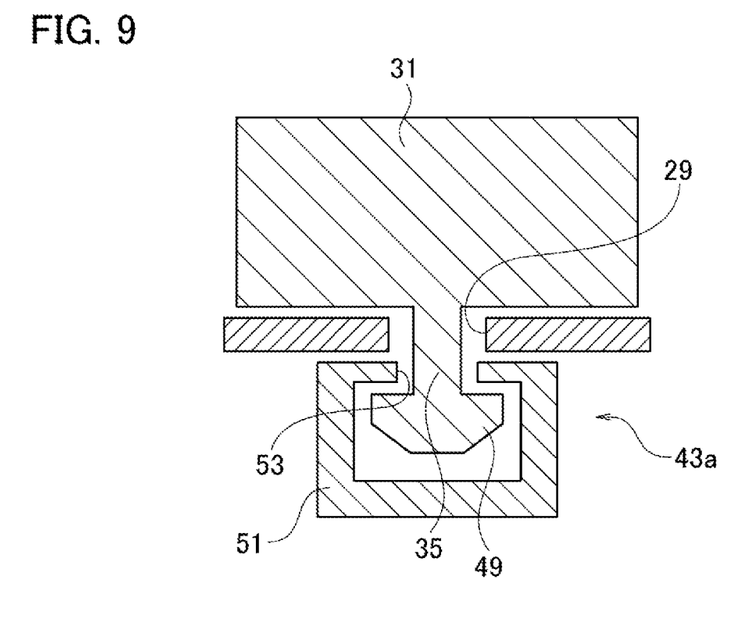
FIG. 9 is a cross-sectional view illustrating another example of a locking part of a charging connector according to an embodiment.

As illustrated in FIG. 9, a locking part 43a has an engagement projection 49 and an engagement member 51. The engagement projection 49 is formed of a member continuous with the first protrusion 35 at the tip of the first protrusion 35. The engagement projection 49 is formed to have a diameter larger than the outer diameter of the first protrusion 35 and can be inserted into the terminal insertion hole 29. The engagement member 51 is made of an elastically deformable material such as a synthetic resin, and is formed into a housing shape larger than the terminal insertion hole 29, for example. An engagement hole 53 that can be engaged with the engagement projection 49 is formed in the engagement member 51. In this kind of locking part 43a, the engagement member 51 is attached by engaging the engagement hole 53 with the engagement projection 49 projecting from the terminal insertion hole 29. By attaching the engagement member 51, the engagement member 51 engages with the edge of the terminal insertion hole 29, and the insertion state of the first protrusion 35 into the terminal insertion hole 29 is maintained.

Figure 10:
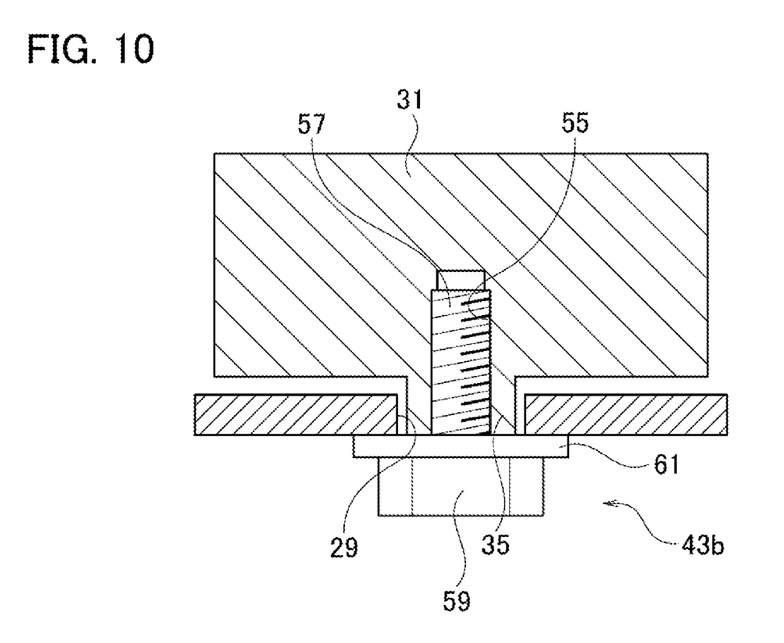
FIG. 10 is a cross-sectional view illustrating another example of a locking part of a charging connector according to an embodiment.

As illustrated in FIG. 10, a locking part 43b has a screw hole 55 and a bolt 57. The screw hole 55 is formed inside the first protrusion 35. A head 59 of the bolt 57 is formed to have a larger diameter than the terminal insertion hole 29. A washer 61 having a larger diameter than the terminal insertion hole 29 is interposed between the head 59 and the terminal insertion hole 29. This kind of locking part 43b fastens the bolt 57 in the screw hole 55 of the first protrusion 35 inserted into the terminal insertion hole 29. By fastening the bolt 57, the head 59 of the bolt 57 (in this case, the washer 61) engages with the edge of the terminal insertion hole 29, and the insertion state of the first protrusion 35 into the terminal insertion hole 29 is maintained.

Figure 11:
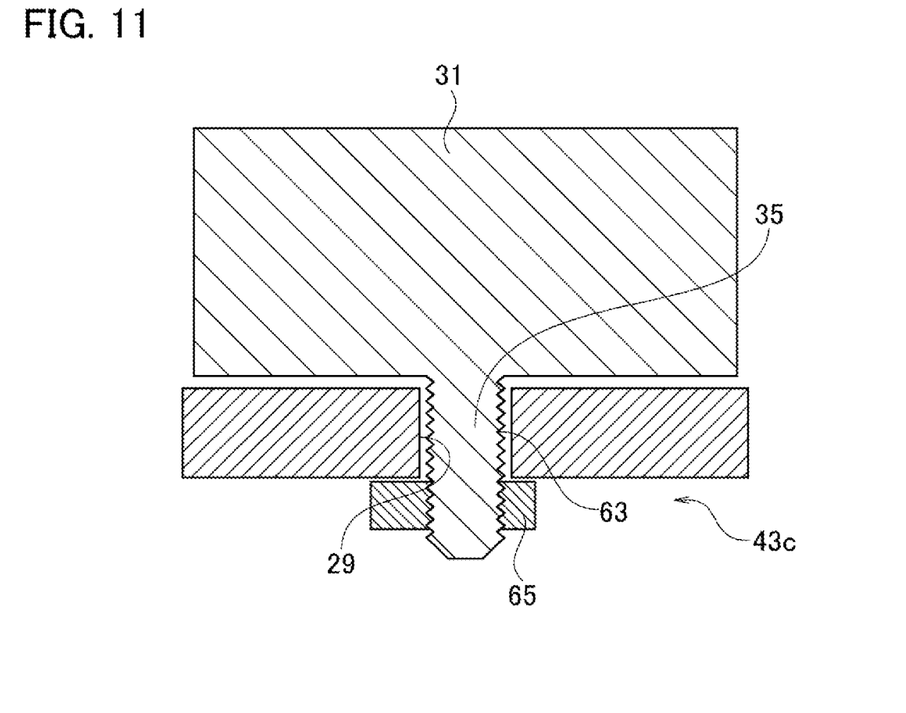
FIG. 11 is a cross-sectional view illustrating another example of a locking part of a charging connector according to an embodiment.

As illustrated in FIG. 11, the locking part 43c has a screw 63 and a nut 65. The screw 63 is formed at the outer periphery of the first protrusion 35. The nut 65 has a larger diameter than the terminal insertion hole 29. This kind of locking part 43c fastens the nut 65 to the screw 63 of the first protrusion 35 protruding from the terminal insertion hole 29. By fastening the nut 65, the nut 65 engages with the edge of the terminal insertion hole 29 and the insertion state of the first protrusion 35 into the terminal insertion hole 29 is maintained.

Figure 12:
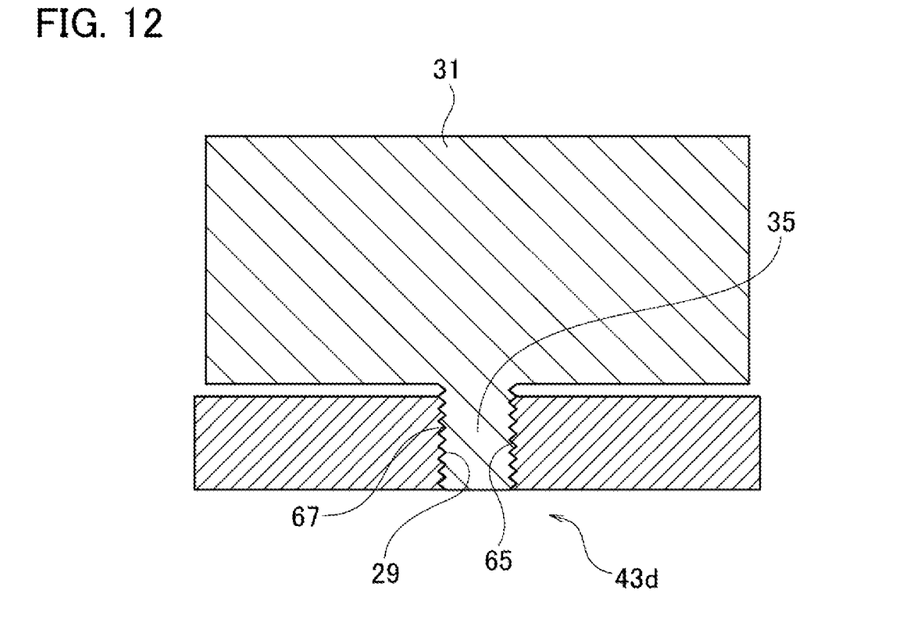
FIG. 12 is a cross-sectional view illustrating another example of a locking part of a charging connector according to an embodiment.

As illustrated in FIG. 12, a locking part 43d has a screw 67 and a screw hole 69. The screw 67 is formed at the outer periphery of the first protrusion 35. The screw hole 69 is formed at the inner periphery of the terminal insertion hole 29. Here, in the locking part 43d, the plurality of body parts 31 are not connected by means of one closing part 33 (see FIG. 8) in order to make the body part 31 rotatable within the quick terminal housing chambers 27 (see FIG. 6). The body parts 31 are shaped to be rotatable in the quick terminal housing chambers 27, and the closing part 33 is provided at each body part 31. The closing part 33 is formed in a shape that can close the openings of the quick terminal housing chambers 27 which constitute at least the quick frontage 23 (see FIG. 6). This kind of locking part 43d rotates the body parts 31 and fastens the screw 67 of the first protrusion 35 to the screw hole 69 of the terminal insertion hole 29. By fastening the screw 67 to the screw hole 69, the insertion state of the first protrusion 35 into the terminal insertion hole 29 is maintained.

Figure 13:
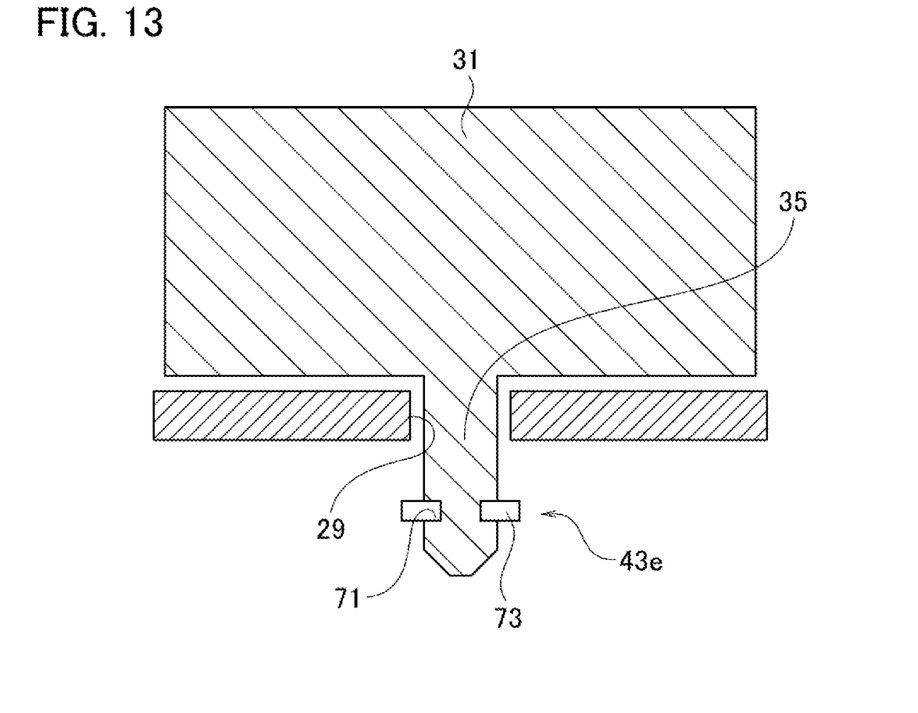
FIG. 13 is a cross-sectional view illustrating another example of a locking part of a charging connector according to an embodiment.

As illustrated in FIG. 13, a locking part 43e has a locking groove 71 and a locking member 73. The locking groove 71 is formed continuously in the circumferential direction on the tip side of the first protrusion 35. The locking member 73 is made of a member that has a notch formed in part thereof and is expandable in diameter such as a C-shaped ring, for example. The locking member 73 is formed to have a larger diameter than the terminal insertion hole 29. In this kind of locking part 43e, the locking member 73 is expanded in diameter to engage with the locking groove 71 of the first protrusion 35 protruding from the terminal insertion hole 29, and the locking member 73 is attached. By attaching the locking member 73, the locking member 73 engages with the edge of the terminal insertion hole 29, and the insertion state of the first protrusion 35 into the terminal insertion hole 29 is maintained.

Figure 14:
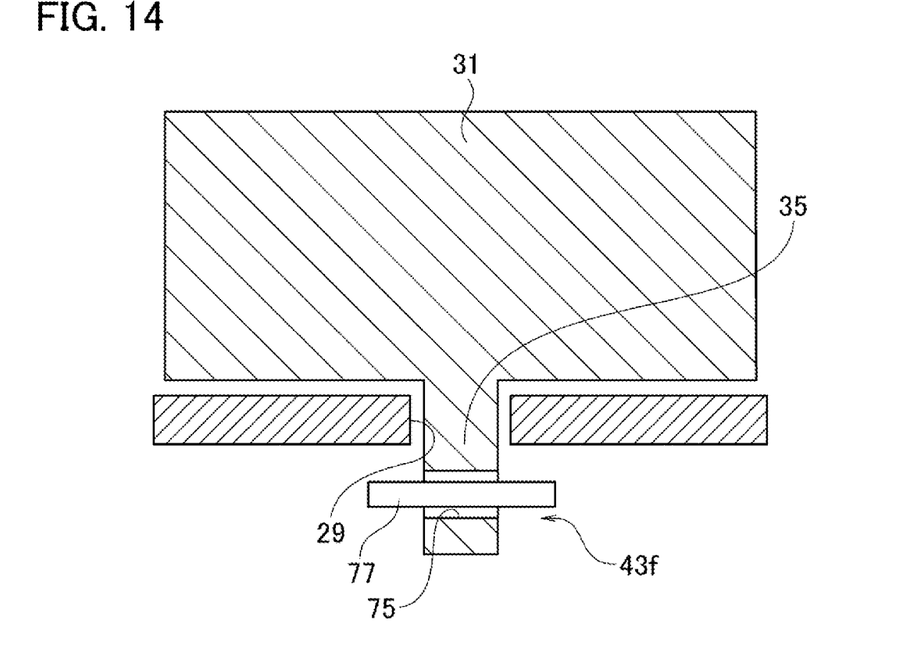
FIG. 14 is a cross-sectional view illustrating another example of a locking part of a charging connector according to an embodiment.

As illustrated in FIG. 14, a locking part 43f has a pin hole 75 and a pin 77. The pin hole 75 is formed on the tip side of the first protrusion 35 and passes through the first protrusion 35 in the radial direction. The pin 77 has a diameter that allows the pin 77 to be inserted into the pin hole 75 and has a larger diameter than the terminal insertion hole 29. In this kind of locking part 43f, the pin 77 is attached by being inserted into the pin hole 75 of the first protrusion 35 protruding from the terminal insertion hole 29. After inserting the pin 77 into the pin hole 75, both ends of the pin 77 may be bent to prevent the pin from slipping out. By attaching the pin 77, the pin 77 engages with the edge of the terminal insertion hole 29, and the insertion state of the first protrusion 35 into the terminal insertion hole 29 is maintained.

Figure 15:
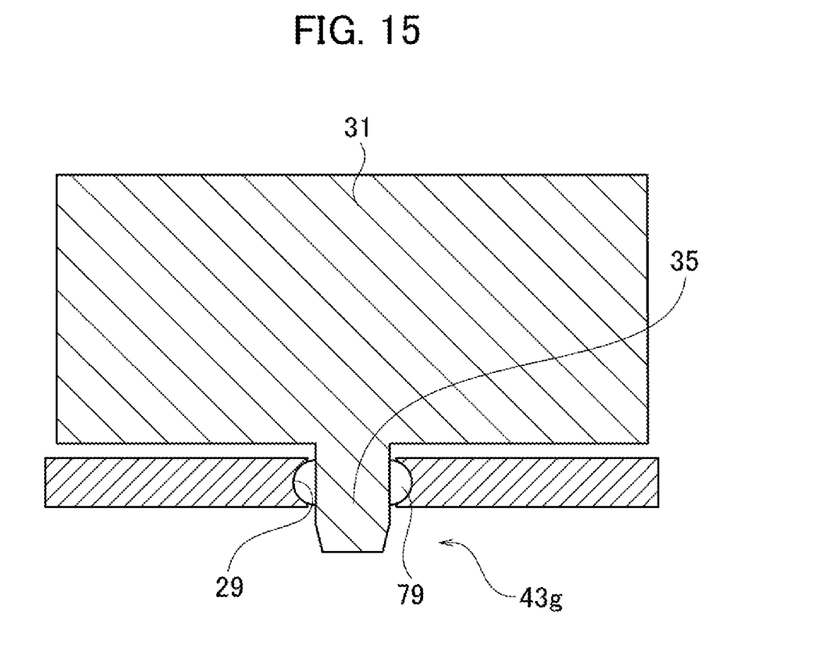
FIG. 15 is a cross-sectional view illustrating another example of a locking part of a charging connector according to an embodiment.

As illustrated in FIG. 15, a locking part 43g has press-fit projections 79. The plurality of press-fit projections 79 are formed in the circumferential direction. The press-fit projections 79 project from the outer surface of the first protrusion 35 and are formed on the tip side of the first protrusion 35. The press-fit projections 79 may be continuously formed in the circumferential direction of the first protrusion 35. The projection height of the press-fit projections 79 is greater than the diameter of the terminal insertion hole 29. The outer surface of the press-fit projections 79 is formed into a curved surface shape. In this kind of locking part 43g, the first protrusion 35 is inserted into the terminal insertion hole 29 and the press-fit projections 79 are press-fitted against the inner surface of the terminal insertion hole 29. By press-fitting the press-fit projections 79, the insertion state of the first protrusion 35 into the terminal insertion hole 29 is maintained.

The other locking part 43 may be an adhesive or the like that is filled between the first protrusion 35 and the terminal insertion hole 29 while the first protrusion 35 is inserted into the terminal insertion hole 29. In addition, a tape winding or the like that is larger than the terminal insertion hole 29 may be applied to the tip of the first protrusion 35 protruding from the terminal insertion hole 29 to form the locking part 43.

In this kind of charging connector 1, the cover 5 has the first protrusion 35 that extends toward the terminal insertion hole 29, is inserted into the terminal insertion hole 29, and holds the cover 5 on the housing 3. For this reason, the cover 5 can be attached to the housing 3 by inserting the first protrusion 35 into the terminal insertion hole 29 originally provided in the housing 3.

Therefore, in this kind of charging connector 1, the quick frontage 23 can be closed by using the cover 5 without changing the design of the housing 3.

The cover 5 has the second protrusion 37 that extends toward the terminal insertion hole 29 and is arranged adjacent to the first protrusion 35. Therefore, when the cover 5 is handled alone, the first protrusion 35 can be protected by means of the second protrusion 37. By protecting the first protrusion 35, damage to the first protrusion 35 can be suppressed and the holding of the cover 5 on the housing 3 can be stabilized.

The insertion state of the first protrusion 35 into the terminal insertion hole 29 is detected by determining whether the second protrusion 37 is inserted into the terminal insertion hole 29. Therefore, it is possible to detect the state in which the cover 5 is attached to the housing 3 by determining whether the second protrusion 37 is inserted into the terminal insertion hole 29.

The first protrusion 35 has the locking part 43 locked into the terminal insertion hole 29. Therefore, the state in which the cover 5 is attached to the housing 3 can be stabilized by inserting the first protrusion 35 into the terminal insertion hole 29 and locking the locking part 43 into the terminal insertion hole 29.

The cover 5 has the flange 39 that closes the quick frontage 23. The wall 41 is formed at the outer periphery of the flange 39. The wall 41 extends toward the terminal insertion hole 29, is formed continuously in the circumferential direction, and is arranged to face the inner surface of the quick frontage 23.

This makes it difficult to insert a jig or the like between the flange 39 and the quick frontage 23. By extending the wall 41 toward the terminal insertion hole 29, even if a jig or the like is inserted, the tip part of the jig is not able to catch and it can be made difficult for the lever action to function. Therefore, this can make it difficult to remove the cover 5 from the housing 3, and the quick frontage 23 can be stably closed by means of the cover 5.

In the charging connector 1 of the present embodiment, the extension length of the second protrusion 37 is shorter than the extension length of the first protrusion 35. However, the extension length is not limited to this, and the extension length of the second protrusion 37 may be equal to or longer than the extension length of the first protrusion 35.

In this case, the extent to which the second protrusion 37 protects the first protrusion 35 increases, and the first protrusion 35 can be stably protected by means of the second protrusion 37. Further, the second protrusion 37 is inserted into the terminal insertion hole 29 before the first protrusion 35. Therefore, the second protrusion 37 can have a guiding function to guide the insertion of the first protrusion 35 into the terminal insertion hole 29.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging connector comprising:
   a housing including a normal fitting part and a quick fitting part, the normal fitting part having a normal frontage to which a normal charging connector is fittable, the quick fitting part having a quick frontage to which a quick charging connector is fittable; and
   a cover configured to close the quick frontage, wherein the quick fitting part has a terminal insertion hole through which a terminal of the quick charging connector is insertable inside the quick fitting part, and
   the cover has a first protrusion extending toward the terminal insertion hole and holding the cover on the housing with the first protrusion being inserted into the terminal insertion hole.

2. The charging connector according to claim 1, wherein the cover includes a second protrusion extending toward the terminal insertion hole and arranged adjacent to the first protrusion.

3. The charging connector according to claim 2, wherein the second protrusion detects an insertion state of the first protrusion into the terminal insertion hole depending on whether the second protrusion is inserted into the terminal insertion hole.

4. The charging connector according to claim 1, wherein the first protrusion includes a locking part locked into the terminal insertion hole.

5. The charging connector according to claim 1, wherein
   the cover includes a flange configured to close the quick frontage, and
   a wall is formed at an outer periphery of the flange, the wall extending toward the terminal insertion hole, formed continuously in a circumferential direction, and arranged to face an inner surface of the quick frontage.

6. A charging connector comprising:
   a housing including a normal fitting part and a quick fitting part, the normal fitting part having a normal frontage to which a normal charging connector is fittable, the quick fitting part having a quick frontage to which a quick charging connector is fittable; and
   a cover configured to close the quick frontage, wherein
   the quick fitting part has a terminal insertion hole through which a terminal of the quick charging connector is insertable inside the quick fitting part,
   the cover has a first protrusion extending toward the terminal insertion hole and holding the cover on the housing with the first protrusion being inserted into the terminal insertion hole,
   the cover includes a second protrusion extending toward the terminal insertion hole and arranged adjacent to the first protrusion, and
   the second protrusion detects an insertion state of the first protrusion into the terminal insertion hole depending on whether the second protrusion is inserted into the terminal insertion hole.

7. The charging connector according to claim 6, wherein the first protrusion includes a locking part locked into the terminal insertion hole.

8. The charging connector according to claim 6, wherein
   the cover includes a flange configured to close the quick frontage, and
   a wall is formed at an outer periphery of the flange, the wall extending toward the terminal insertion hole, formed continuously in a circumferential direction, and arranged to face an inner surface of the quick frontage.

* * * * *